(12) United States Patent
Schroeder

(10) Patent No.: US 6,486,656 B1
(45) Date of Patent: Nov. 26, 2002

(54) MAGNETORESISTIVE DIE AND POSITION SENSOR

(75) Inventor: Thaddeus Schroeder, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/413,420

(22) Filed: Oct. 6, 1999

(51) Int. Cl.$^7$ ................................................ G01B 7/30
(52) U.S. Cl. ............................. 324/207.21; 324/207.25
(58) Field of Search .................... 324/207.21, 207.25, 324/252, 249; 338/32 R; 360/113

(56) References Cited

U.S. PATENT DOCUMENTS

| | | | |
|---|---|---|---|
| 3,753,202 A | * 8/1973 | Kataoka et al. | 338/32 H |
| 4,835,467 A | 5/1989 | Gokhale | 324/166 |
| 4,926,122 A | 5/1990 | Schroeder et al. | 324/207.13 |
| 4,939,456 A | 7/1990 | Morelli et al. | 324/207.21 |
| 5,153,557 A | 10/1992 | Partin et al. | 338/32 R |
| 5,184,106 A | 2/1993 | Partin et al. | 338/32 R |
| 5,570,016 A | 10/1996 | Schroeder et al. | 324/207.25 |
| 5,714,883 A | 2/1998 | Schroeder et al. | 324/207.22 |
| 5,731,702 A | 3/1998 | Schroeder et al. | 324/207.21 |
| 5,754,042 A | 5/1998 | Schroeder et al. | 324/207.25 |

FOREIGN PATENT DOCUMENTS

| | | |
|---|---|---|
| DE | 40 14 885 | 7/1995 |
| DE | 44 08 078 | 9/1995 |
| DE | 195 32 674 | 11/1996 |
| JP | 59-41882 | * 3/1984 |
| JP | 07190803 | 7/1995 |

OTHER PUBLICATIONS

Sensoren, Magnetfeldhalbleiter, Teil 1, Datenbuch 1982/83, Published by: Siemens AG, Bereich Bauelemente, Balanstrabe 73, 8000 Munchen 80, pp. 46 and 166.

* cited by examiner

*Primary Examiner*—Jay Patidar
(74) *Attorney, Agent, or Firm*—Margaret A. Dobrowitsky

(57) ABSTRACT

A galvanomagnetic position sensor (36, 18) wherein a single die MR sensor (22, 22') senses the rotation of an end face (14) of a motor shaft (12) which is made of a ferromagnetic material and generates three sinusoidal voltage signals with 120 degree phase shifts. In a first implementation, an MR die incorporating a plurality of matched pie-shaped MR elements (MR1, MR2, MR3, MR4, MR5, MR6) collectively form a circular area. When the motor shaft rotates, a tooth (18) of the end face sweeps past the MR elements resulting in resistance modulation of each MR element between a maximum resistance and a minimum resistance whereby three sinusoidal voltage signals spaced 120 degrees apart are provided, via OpAmps (AMP1, AMP2, AMP3) or voltage dividers and OpAmps (AMP1', AMP2'). From these voltage signals the shaft rotative position is known. In a second implementation of the present invention, the single MR sensor consists of an MR die (22") wherein each of a plurality of MR elements (23") consists of three interdigitated electrically isolated MR segments collectively forming a circular area, wherein OpAmps are obviated and the sensor circuit is totally passive.

10 Claims, 5 Drawing Sheets

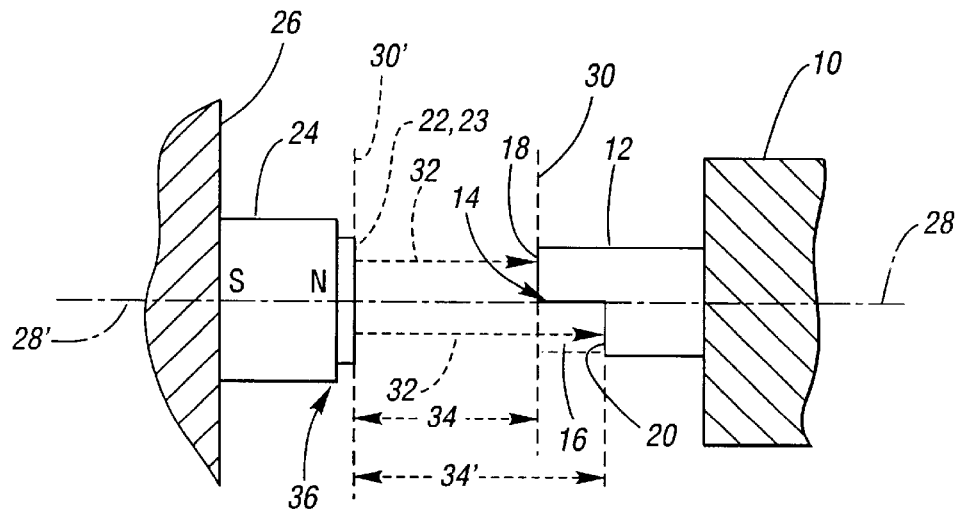
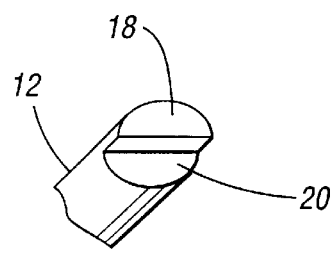
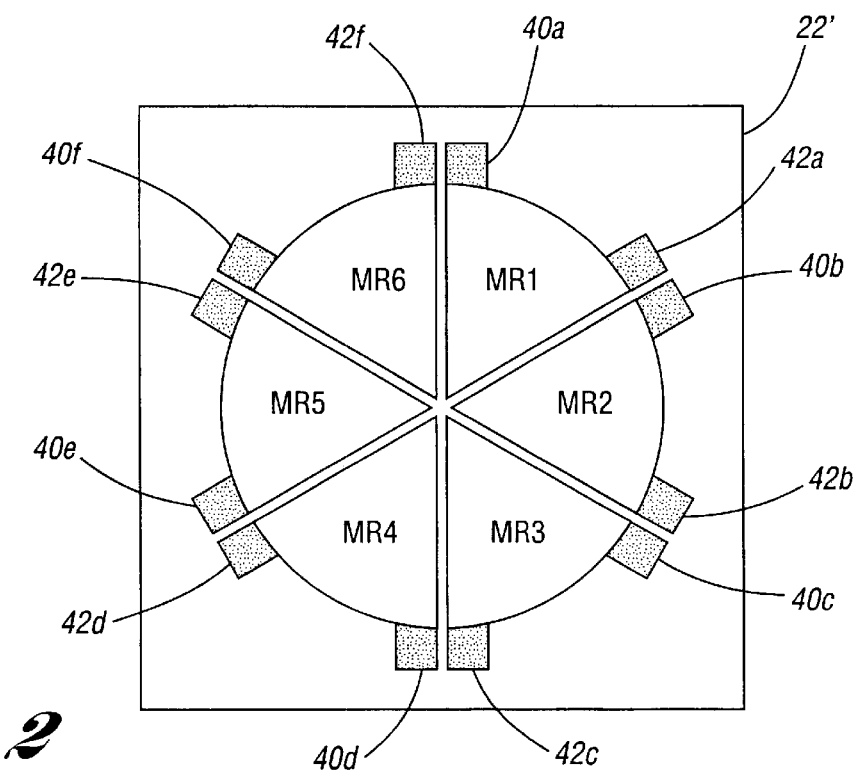
Fig. 1A
Fig. 1B
Fig. 2

MAGNETORESISTIVE DIE AND POSITION SENSOR

TECHNICAL FIELD

The present invention relates to galvanomagnetic position sensing of a rotating shaft.

BACKGROUND OF THE INVENTION

It is well known in the art that the voltage modulation of Hall elements or the resistance modulation of magnetoresistors can be employed in position and speed sensors with respect to moving magnetic materials or objects (see for example U.S. Pat. Nos. 4,835,467, 4,926,122, and 4,939,456). In such applications, the magnetoresistor (MR) is biased with a magnetic field and electrically excited, typically, with a constant current source or a constant voltage source. A magnetic (i.e., ferromagnetic) object moving relative, and in close proximity, to the MR, such as a tooth, produces a varying magnetic flux density through the MR, which, in turn, varies the resistance of the MR. The MR will have a higher magnetic flux density and a higher resistance when a tooth is adjacent to the MR than when a slot is adjacent to the MR.

Increasingly more sophisticated spark timing and emission controls introduced the need for crankshaft sensors capable of providing precise position information during cranking. Various combinations of magnetoresistors and single and dual track toothed or slotted wheels (also known as encoder wheels and target wheels) have been used to obtain this information (see for example U.S. Pat. Nos. 5,570,016, 5,714,883, 5,731,702, and 5,754,042).

The crank position information is encoded on a rotating target wheel in the form of teeth and slots. Virtually all such sensors are of the magnetic type, either variable reluctance or galvanomagnetic (e.g. Hall generators or magnetoresistors). Galvanomagnetic sensors are becoming progressively most preferred due to their capability of greater encoding flexibility and speed independent output signals.

Furthermore, virtually all brushless motors require rotor position sensors to operate. The simplest and most common method of sensing rotor position is by means of an arrangement of three individual Hall sensors. These sensors have to be placed at specific locations on the motor stator periphery, and spaced 120 degrees from each other. In addition, they provide only a very basic commutation signal. If more precise motor control and operation are required, then an additional high-resolution sensor is also needed.

Siemens Corporation disclosed in a 1982/83 data book a noncontact differential MR sensor for detecting shaft rotation position. In this disclosure, a pair of rectangularly shaped and parallel arranged MRs are located adjacent to, and axially aligned with, the end of a rotating shaft, wherein the shaft has a rectangular permanent magnet mounted thereto which covers a portion of the end of the shaft. With 360 degrees of rotation of the shaft, the permanent magnet controls the MR sensor (part FP212L100) to generate a single sine-like output signal. This output signal has low accuracy due to the limited range of angular position resolution that a single sine curve can provide. This low accuracy limits the usefulness of this sensor for motor control applications.

Therefore, what remains needed is a simple and inexpensive noncontact sensor which provides high resolution rotor position at all times.

SUMMARY OF THE INVENTION

The present invention provides a galvanomagnetic position sensor, wherein a single die MR sensor senses the rotation of the end face of a motor shaft having a magnetic irregularity (as for example a semicircular ferromagnetic tooth) and generates at least two periodically varying voltage signals having a predetermined phase spacing therebetween (as for example three sinusoidal signals with 120 degree phase shifts). In addition, disclosed is a unique MR die configuration for this sensor, and the appropriate sensor interface circuit therefor.

In a first implementation of the present invention, the single MR sensor consists of an MR die incorporating a plurality of matched pie-shaped MR elements collectively forming a circular area. Structurally, the MR die consists of a plurality of electrically independent pie shaped segments, each characterized by a magnetosensitive material. In the first implementation of the present invention, the segments are by way of example composed of indium antimonide (InSb) epitaxial film mesas, or film mesas of another suitable magnetosensitive material. The techniques to fabricate the MR elements is elaborated in U.S. Pat. No. 5,153,557, issued Oct. 6, 1992 and U.S. Pat. No. 5,184,106, issued Feb. 2, 1993, both of which being hereby incorporated by reference herein.

It is preferable that the MR elements be matched to each other and that the geometry of the MR elements be such that the magnitude of the increase of the resistance of one MR element is the same as the magnitude of the decrease in resistance of a diametrically opposed MR element, but this is not essential. Proper circuit design with appropriate weighting factors, determined empirically or theoretically, can be applied by those of ordinary skill in the art to accommodate MR element mismatch and geometries.

The MR die is mounted on a bias magnet and affixed to face toward the end face of the motor shaft which is made of a ferromagnetic material. The center of the shaft is aligned with the center of the MR die and the end face of the shaft is parallel to the plane of the MR die. One half of the shaft end face is a few millimeters shorter than the other half creating a half circular tooth covering one half of the total MR die area. When the motor shaft rotates, that tooth sweeps past the MR elements and covers one half of the total MR die area at all times. Due to the higher magnetic flux density under the tooth, the MR elements under the tooth increase their resistance resulting in the resistance modulation of each MR element between a maximum resistance and a minimum resistance. By a proper selection of the MR elements, a properly designed circuit can obtain three sinusoidal voltage signals spaced 120 degrees apart. For example, the resistance changes of the MR elements can be converted into corresponding sinusoidal voltage signals by using a plurality of matched current sources to drive each MR element independently and then using operational amplifiers (OpAmps) to derive the three sinusoidal output voltages. Alternatively, the resistance changes of the MR elements can be converted into corresponding sinusoidal voltage signals by using a constant voltage source to drive the plurality of MR elements utilizing voltage dividers and OpAmps to derive the sinusoidal output voltages.

In a second implementation of the present invention, the single MR sensor consists of an MR die wherein each of a plurality of MR elements consists of three interdigitated electrically isolated MR segments collectively forming a circular area, wherein OpAmps are obviated and the sensor circuit is totally passive. This permits one to use electrically independent, but magnetically interdependent voltage dividers to generate three sinusoidal signals with 120 degree phase shifts.

Structurally, in the second implementation, the present invention is composed of an MR die wherein each MR element of a plurality of MR elements thereof consists of three interdigitated electrically isolated MR segments wherein each MR segment is characterized by a magnetosensitive material. Respective interdigitated MR segments of each of the plurality of MR elements are electrically connected such as to form an MR sensor consisting of three groups of a plurality of interdigitated segments apiece. In the second implementation of the present invention, the MR segments are composed of indium antimonide (InSb) epitaxial film mesas, or film mesas of another suitable magnetoresistive material. The ends of the MR segments of each MR element are connected to their respective bonding pads (or terminals) by which electrical connections may be made to the MR die. The techniques to fabricate the MR elements are elaborated in the aforementioned U.S. Pat. Nos. 5,153, 557 and 5,184,106.

It is preferable that the respective corresponding MR interdigitated segments within each group be matched to each other and that the geometry of the interdigitation of the MR segments is such that the magnitude of the increase of the resistance of one MR segment within one group is the same as the magnitude of the decrease in resistance of a respective corresponding MR segment within a diametrically opposed group, but this is not essential. Proper circuit design with appropriate weighting factors determined empirically or theoretically can be applied by those of ordinary skill in the art to accommodate MR segment mismatch and interdigitation geometries.

The MR die is mounted on a bias magnet and affixed to face toward the end face of the motor shaft, wherein at least an end portion thereof is composed of a ferromagnetic material which provides a magnetic irregularity. The center of the shaft is aligned with the center of the die and the end face of the shaft is parallel to the plane of the MR die. One half of the end face is a few millimeters shorter than the other half creating a half circular tooth covering one half of the total MR die area. When the motor rotates, that tooth sweeps through the MR segments and covers one half of the total MR die area at all times. Due to the higher magnetic flux density under the tooth, the MR segments under the tooth increase their resistance resulting in a resistance modulation of each MR segment between a maximum resistance and a minimum resistance. By a proper selection of the MR groups one can obtain a plurality of periodically varying voltage signals having a predetermined phase spacing therebetween, as for example three sinusoidal voltage signals spaced 120 degrees apart. For example, the resistance changes of the MR groups can be converted into corresponding sinusoidal voltage signals by using a constant voltage source to drive the MR segments and then using three voltage dividers thereby enabling the MR sensor to be totally passive.

Accordingly, it is a preferred object of the present invention to provide a position sensor wherein a single MR die consisting of a plurality of matched pie-shaped MR elements, collectively forming a circular area, acts as a single MR sensor to sense rotor position from the position of a ferromagnetic tooth on a shaft of a motor with respect to the MR sensor.

It is an additional preferred object of the present invention to provide a position sensor wherein a single MR die has a plurality of MR elements consisting of three interdigitated electrically isolated MR segments such that each MR segment is characterized by a magnetosensitive material, wherein the MR die acts as a single MR sensor to sense rotor position from the position of a ferromagnetic tooth on a shaft of a motor with respect to the MR sensor.

These, and additional objects, advantages, features, and benefits of the present invention will become apparent from the following specification.

BRIEF DESCRIPTION OF THE DRAWINGS

FIG. 1A depicts an example of a preferred environment of use of an MR position sensor according to the present invention.

FIG. 1B depicts a perspective view of the motor shaft of FIG. 1A.

FIG. 2 depicts an implementation of a first preferred embodiment of an MR die according to the present invention.

DESCRIPTION OF THE PREFERRED EMBODIMENT

Figure 3:
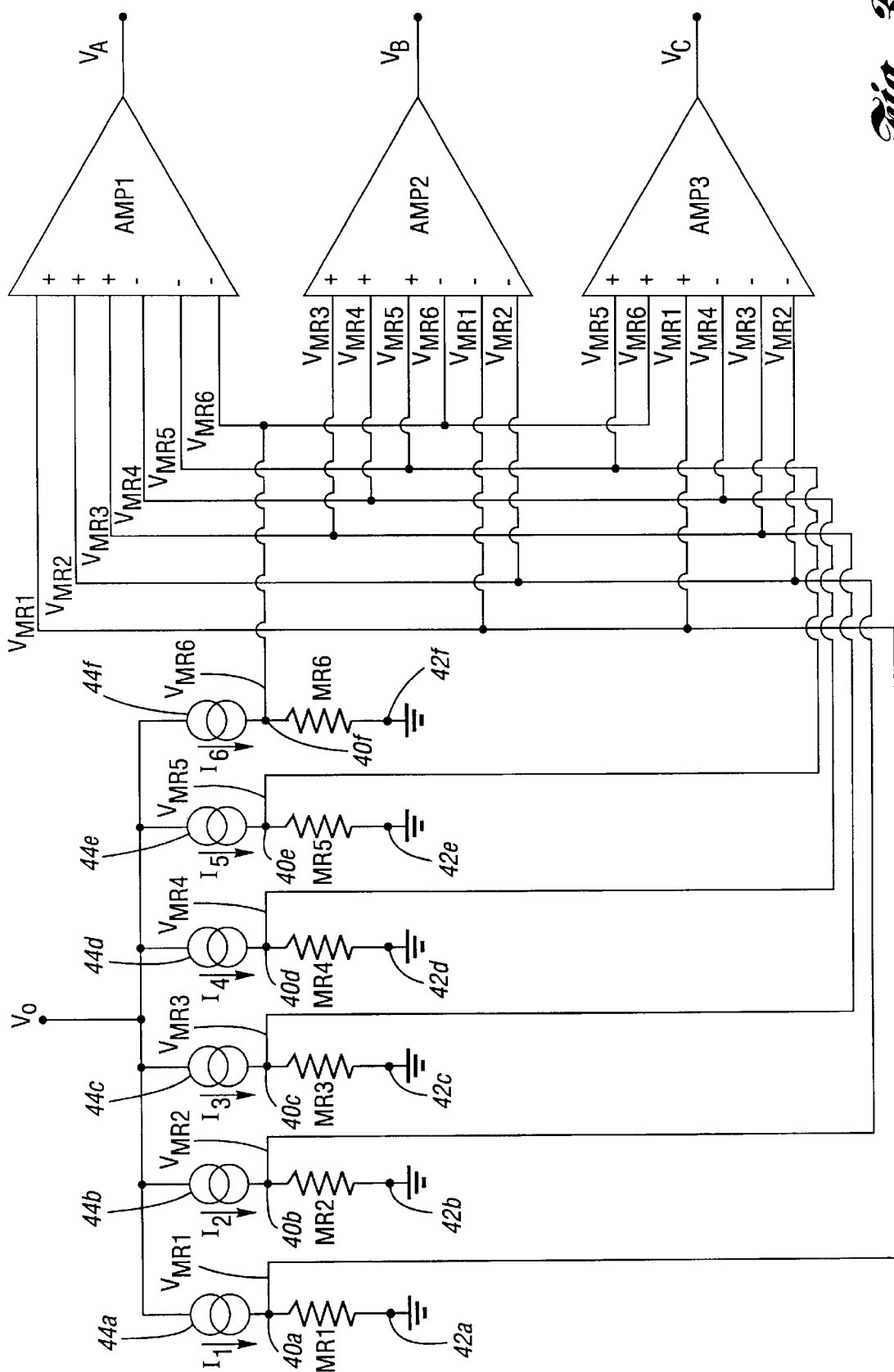
FIG. 3 depicts a first example of the electronics for implementing an MR sensor utilizing the MR die of FIG. 2 according to the present invention.

It is well known in the art that the resistance of an MR element can be modulated by a varying magnetic flux density through the MR element. In this regard, varying magnetic flux varies the resistance of the MR element, whereby a higher magnetic flux density through the MR element increases the resistance of the MR element and a lower magnetic flux density through the MR element decreases the resistance of the MR element. The portions of MR elements under a ferromagnetic material (i.e. a tooth) are exposed to a considerably higher magnetic field than the portions of MR elements not under the ferromagnetic material (i.e. a slot). The areas of the MR elements of the sensor are essentially the same. Thus, the more area of one MR element covered by a ferromagnetic material, the greater the resistance of that MR element or the more area of one MR element covered by a slot, the less the resistance of that MR element. A properly designed electrical circuit can incorporate this change in resistance and produce an output voltage which, in the context of the present invention, is a sinusoidal function of the position of the ferromagnetic material or slot.

FIG. 1A depicts an example of a preferred environment of use of an MR position sensor 36 according to the present invention, wherein a motor 10 has a rotating shaft 12 made of a ferromagnetic material and the rotative position thereof is to be sensed. The end face 14 at a free end of the shaft 12 has a semicircular (half circular) section 16 removed thereby creating a half circular tooth 18 and a half circular slot 20 as depicted in FIGS. 1A and 1B. The MR sensor 36 consists of an MR die 22, composed of MR elements 23, mounted on a bias magnet 24 wherein the magnetic flux 32 emanating therefrom is represented by the dashed arrows and passes from the bias magnet through the MR die and through the air gaps 34 and 34' to the shaft 12. The sensor 36 is affixed to a surface 26 which is stationary with respect to the rotating shaft 12 such that the MR die 22 faces the end face 14 of the free end of the shaft 12. The center line 28 of the shaft 12 is aligned with the center line 28' of the die 22 such that the half circular tooth 18 covers one half of the total MR die area at all times and the plane 30 of the end face 14 of the shaft is parallel to the plane 30' of the MR die. When the shaft 12 rotates, the tooth 18 sweeps past the MR elements 23 of the MR die 22 such that the tooth covers one half of the total MR die area at all times. Due to the higher magnetic flux density 32 under the tooth 18, the MR elements 23 under the tooth increase their resistance while the MR elements under the slot decrease their resistance thereby resulting in resistance modulation of each MR element between a maximum resistance and a minimum resistance as previously described. By a proper selection of the MR elements 23, a properly designed circuit can obtain three sinusoidal voltage signals spaced 120 degrees apart.

FIG. 2 depicts an implementation of a first preferred embodiment of an MR die 22' according to the present invention. As shown at FIG. 2, the MR die 22' consists of a plurality of MR elements, wherein each MR element is matched to the other MR elements. There are six MR elements depicted at FIG. 2: MR1, MR2, MR3, MR4, MR5, and MR6, each having, respectively, resistances: $R_{MR1}$, $R_{MR2}$, $R_{MR3}$, $R_{MR4}$, $R_{MR5}$, and $R_{MR6}$ which vary with magnetic field variation.

According to the first preferred embodiment depicted at FIG. 2, each MR element is pie shaped and has a circular curvature to the outer periphery thereof. Each MR element is composed of indium antimonide (InSb) epitaxial film mesas, but may be composed of another suitable magnetoresistive material, and are connected to their respective bonding pads (or terminals) by which electrical connections may be made to the MR die, as follows.

The end points of MR element MR1 terminate at a first terminal (bonding pad) 40a and a second terminal (bonding pad) 42a. The end points of MR element MR2 terminate at a third terminal (bonding pad) 40b and a fourth terminal (bonding pad) 42b. The end points of MR element MR3 terminate at a fifth terminal (bonding pad) 40c and a sixth terminal (bonding pad) 42c. The end points of MR element MR4 terminate at a seventh terminal (bonding pad) 40d and an eighth terminal (bonding pad) 42d. The end points of MR element MR5 terminate at a ninth terminal (bonding pad) 40e and a tenth terminal (bonding pad) 42e. The end points of MR element MR6 terminate at an eleventh terminal (bonding pad) 40f and a twelfth terminal (bonding pad) 42f.

According to a preferred method of fabrication, an indium antimonide, or another suitable magnetoresistive material, epitaxial film is formed, then masked and etched to thereby provide the aforementioned mesas characterizing the elements MR1 through MR6. The techniques for fabricating the MR elements are elaborated in the aforementioned U.S. Pat. Nos. 5,153,557 and 5,184,106.

FIG. 3 depicts a first example of the electronics for implementing an MR sensor 36 utilizing the MR die 22' of FIG. 2 according to the present invention. Voltage source $V_0$ supplies power to matched constant current sources 44a, 44b, 44c, 44d, 44e, and 44f thereby supplying currents, for example as follows: $I_1$ to terminal (bonding pad) 40a of MR1; $I_2$ to terminal (bonding pad) 40b of MR2; $I_3$ to terminal (bonding pad) 40c of MR3; $I_4$ to terminal (bonding pad) 40d of MR4; $I_5$ to terminal (bonding pad) 40e of MR5; and, $I_6$ to terminal (bonding pad) 40f of MR6; wherein all the aforementioned currents are matched and each other respective terminal (bonding pad) of each MR element, for example, 42a of MR1, 42b of MR2, 42c of MR3, 42d of MR4, 42e of MR5, and 42f of MR6, are connected to ground, thereby producing output voltages $V_{MR1}$ from MR1, $V_{MR2}$ from MR2, $V_{MR3}$ from MR3, $V_{MR4}$ from MR4, $V_{MR5}$ from MR5, and $V_{MR6}$ from MR6. Voltage source $V_0$ also supplies power to amplifiers AMP1, AMP2, and AMP3 (the connections not being shown). Ground connections to amplifiers AMP1, AMP2, and AMP3 are also provided (but are not shown as well). It is also noted that all voltages are measured with respect to ground unless otherwise indicated.

Amplifiers AMP1, AMP2, and AMP3 are summing OpAmps, whose implementations are well known by those skilled in the art, providing sinusoidal output voltages $V_A$, $V_B$, and $V_C$, spaced 120 degrees apart from one another, respectively. In this particular example, the voltage difference between the sums of any three consecutive MR elements MR1, MR2, MR3, MR4, MR5 and MR6 is a sinusoidal function of the tooth 18 position as the shaft 12 rotates, thereby varying the resistance of the MR elements as previously described. If, as in the example of FIG. 3, $V_A=(V_{MR1}+V_{MR2}+V_{MR3})-(V_{MR4}+V_{MR5}+V_{MR6})$, $V_B=(V_{MR3}+V_{MR4}+V_{MR5})-(V_{MR6}+V_{MR1}+V_{MR2})$, and $V_C=(V_{MR5}+V_{MR6}+V_{MR1})-(V_{MR2}+V_{MR3}+V_{MR4})$ then $V_A$, $V_B$, and $V_C$ are sinusoidal voltages spaced 120 degrees apart from one another, respectively, wherein, for example, $V_B$ would lag (or lead) $V_A$ by 120 degrees and $V_C$ would lag (or lead) $V_A$ by 240 degrees thereby providing the means to determine the position of the shaft (rotor) 12 of the motor 10.

Figure 4:
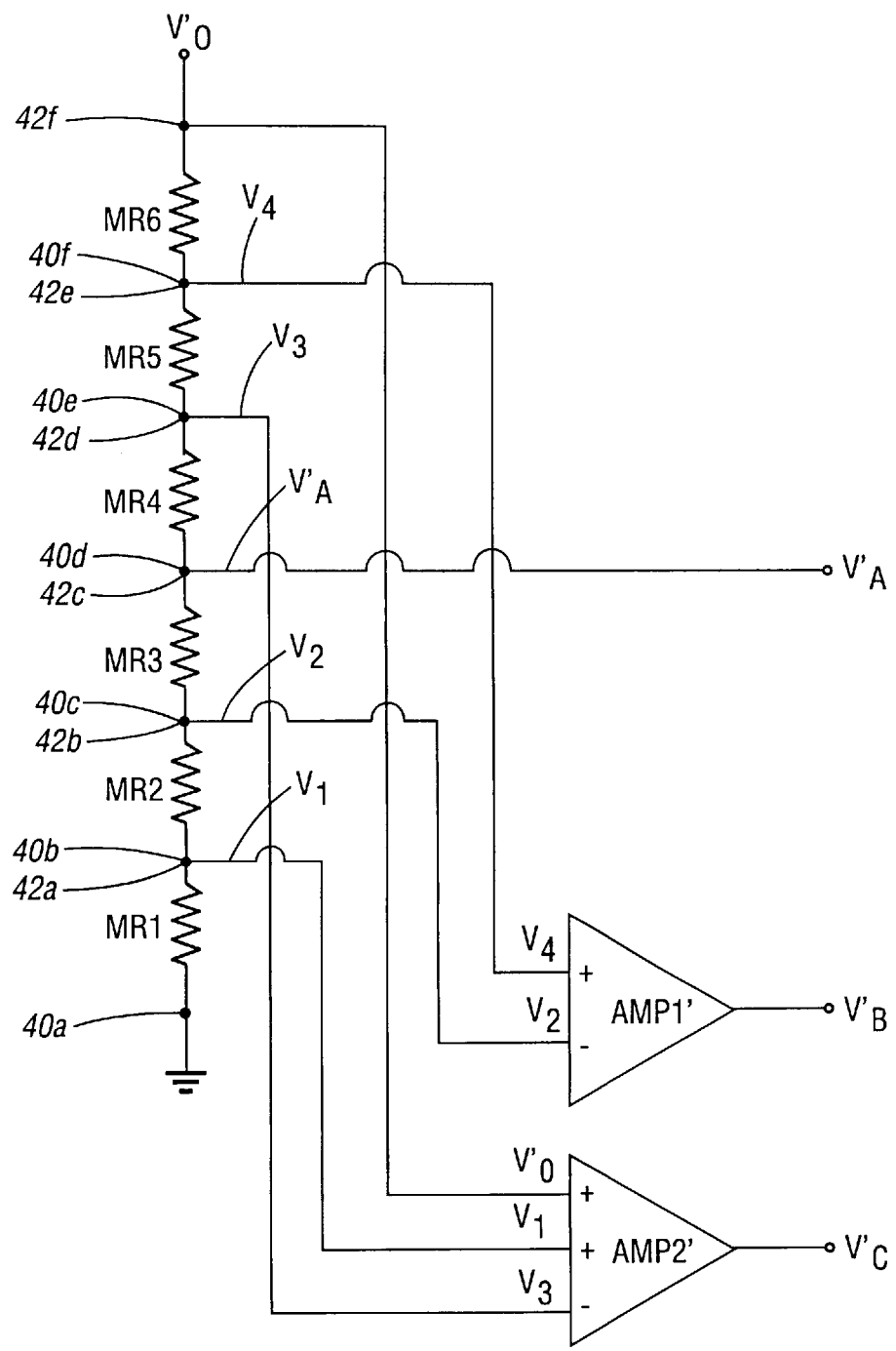
FIG. 4 depicts a second example of the electronics for implementing a sensor utilizing the MR die of FIG. 2 according to the present invention.

FIG. 4 depicts a second example of the electronics for implementing an MR sensor 36 (shown at FIG. 1) utilizing the MR die 22' of FIG. 2 according to the present invention. The MR elements are connected serially such that, for example, terminal (bonding pad) 42a is connected to terminal (bonding pad) 40b, terminal (bonding pad) 42b is connected to terminal (bonding pad) 40c, terminal (bonding pad) 42c is connected to terminal (bonding pad) 40d, terminal (bonding pad) 42d is connected to terminal (bonding pad) 40e, and terminal (bonding pad) 42e is connected to terminal (bonding pad) 40f. Voltage source $V'_0$ supplies power to the serially connected MR elements at the connection of, for example, terminal (bonding pad) 42f and also supplies power to amplifiers AMP1' and AMP2' (the connections not being shown). Terminal (bonding pad) 40A, in this example, is connected to ground. Ground connections to amplifiers AMP1' and AMP2' are also provided (but are not shown as well). It is also noted that all voltages are measured with respect to ground unless otherwise indicated.

Amplifiers AMP1' and AMP2' are summing OpAmps, whose implementations are well known by those skilled in the art, providing sinusoidal output voltages $V'_B$, and $V'_C$ spaced 120 degrees apart from $V'_A$ and from one another, respectively. The output voltages $V'_A$, $V'_B$, and $V'_C$ are sinusoidal functions of the tooth 18 position spaced 120 degrees apart from one another, respectively as the shaft 12 rotates, whereby the resistance of the MR elements vary as previously described, wherein $V'_A=V'_0\times(R_{MR1}+R_{MR2}+R_{MR3})/(R_{MR1}+R_{MR2}+R_{MR3}+R_{MR4}+R_{MR5}+R_{MR6})$, $V'_B=V'_0\times(R_{MR3}+R_{MR4}+R_{MR5})/(R_{MR1}+R_{MR2}+R_{MR3}+R_{MR4}+R_{MR5}+R_{MR6})$, and $V'_C=V'_0\times(R_{MR5}+R_{MR6}+R_{MR1})/(R_{MR1}+R_{MR2}+R_{MR3}+R_{MR4}+R_{MR5}+R_{MR6})$. In this example $V'_B$ would lag (or lead) $V'_A$ by 120 degrees and $V'_C$ would lag (or lead) $V'_A$ by 240 degrees thereby providing the means to determine the position of the shaft (rotor) 12 of the motor 10.

Figure 5:
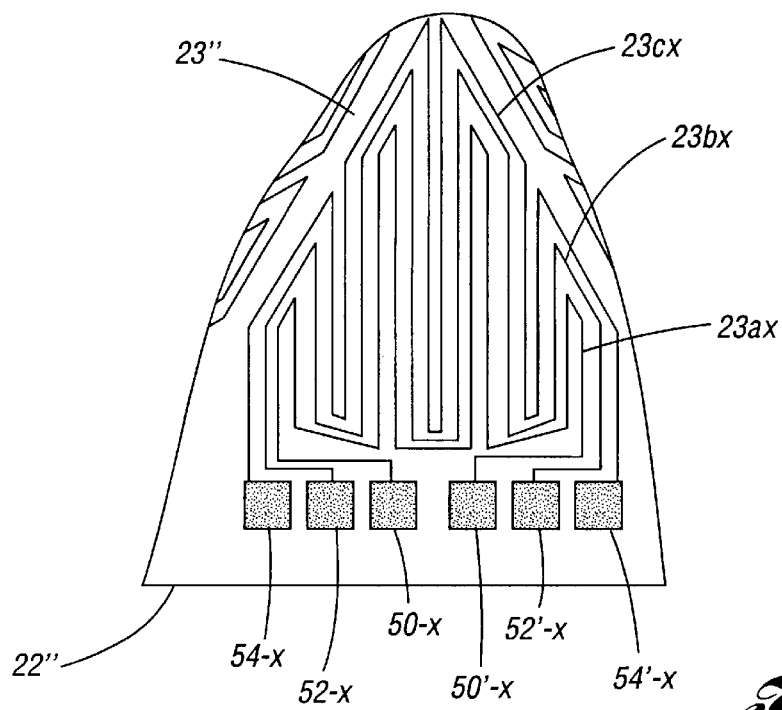
FIG. 5 depicts an MR element of a second preferred embodiment of an MR die according to the present invention.
Figure 5A:
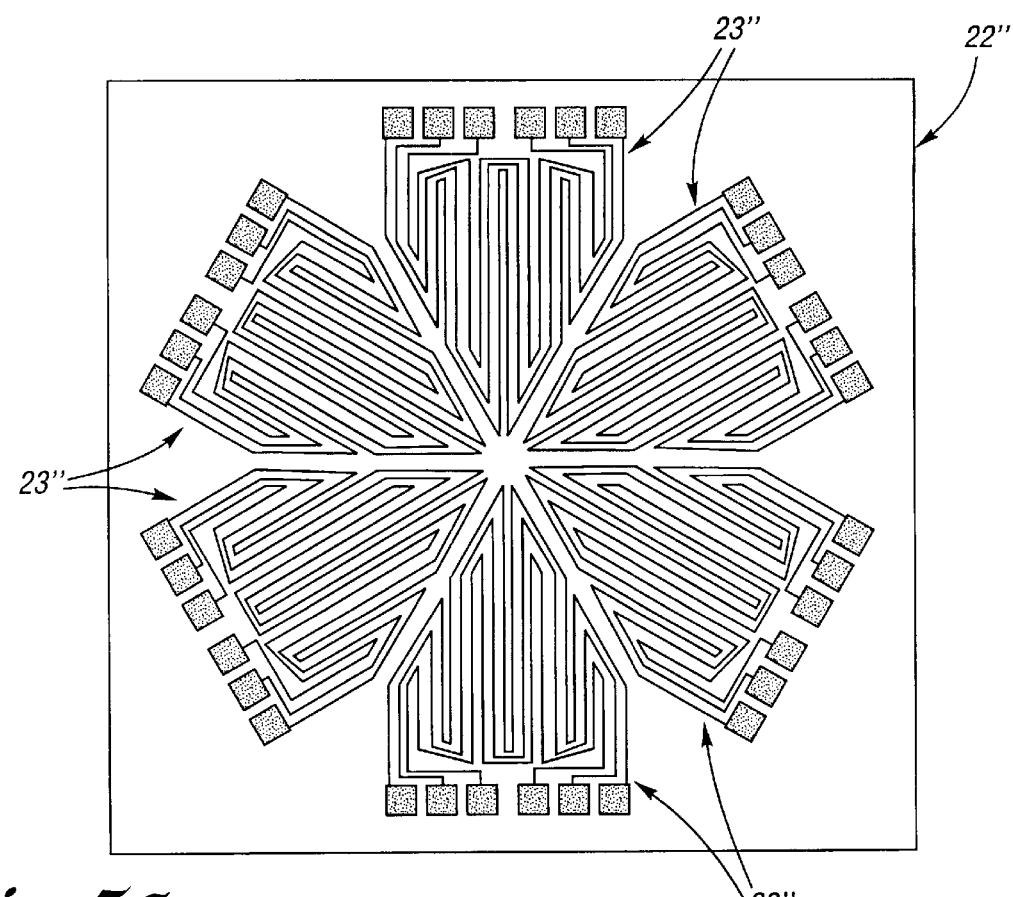
FIG. 5A depicts the second embodiment of the MR die according to the present invention.
Figure 6:
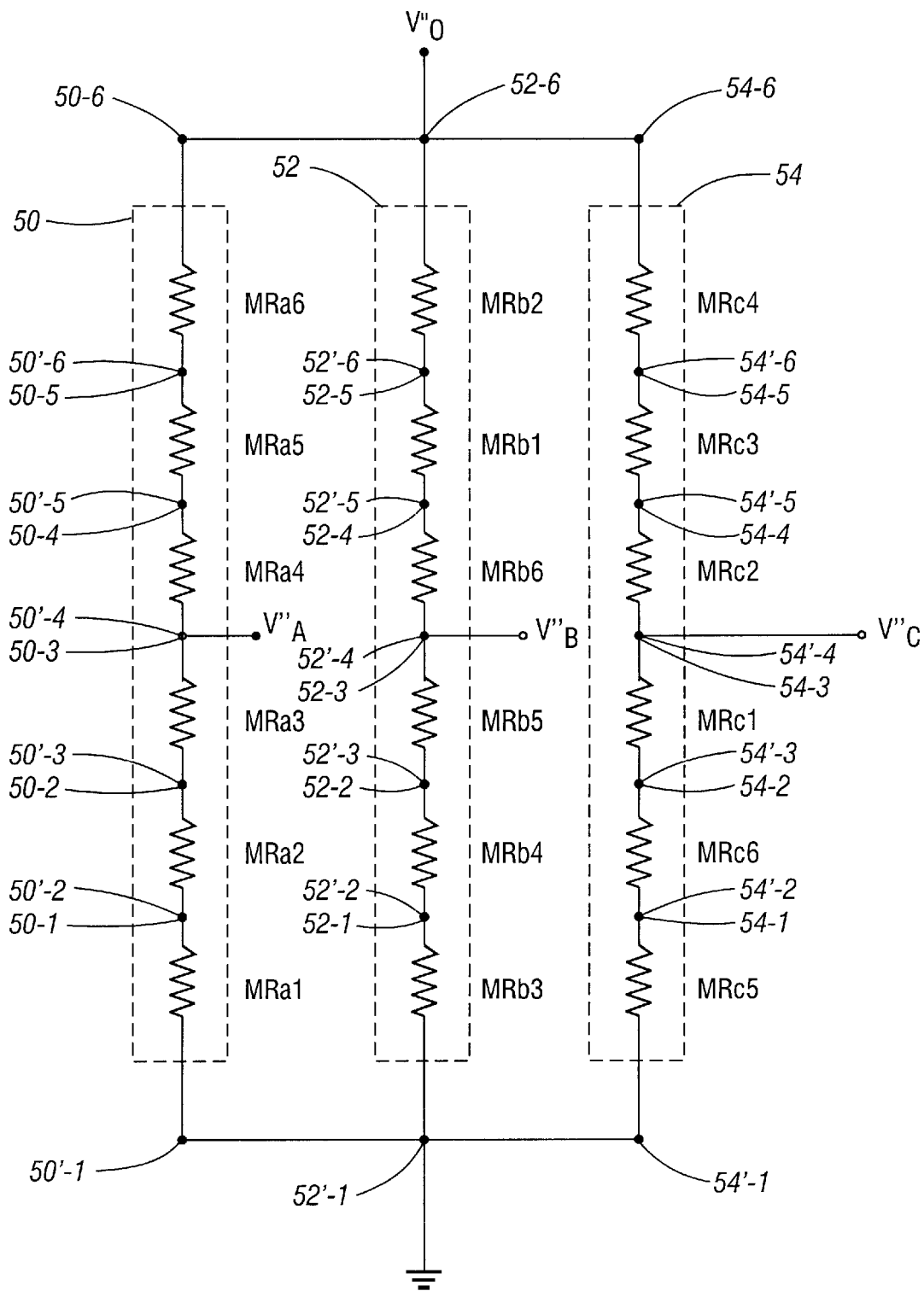
FIG. 6 depicts an example of the electronics for implementing an MR sensor utilizing a plurality of the MR elements of FIGS. 5 and 5A according to the present invention.

An implementation of a second preferred embodiment of an MR element 23" of an MR die 22" is shown structurally at FIGS. 5 and 5A and electronically at FIG. 6. Each MR element 23" is pie shaped, and the outer periphery (as seen between terminals (bonding pads) 54-x and 54'-x) may be considered more-or-less straight.

Structurally, the MR element 23" of FIG. 5 exemplifies each of a plurality, preferably six, of MR elements comprising the MR die 22" of FIG. 5A. Each of the six MR elements 23" consists of three interdigitated electrically isolated MR segments 23ax, 23bx and 23cx wherein each MR segment is characterized by a magnetosensitive material and the subscript "x", taking on values from one to six, identifies one specific MR element of the possible six MR elements of the die 22" (i.e. 23a4 identifies the segment "a" of the fourth element of the die). Respective interdigitated segments 23ax, 23bx, and 23cx of each of the six MR elements 23" are electrically connected such as to form an MR sensor 36 (shown at FIG. 1) consisting of three groups of six interdigitated MR segments apiece for a total of eighteen MR segments.

An understanding of this electrical connection scheme can be gleaned from reference to FIGS. 5, 5A and 6. For example, a first group 50 in FIG. 6 consists of the MR segments 23a1, 23a2, 23a3, 23a4, 23a5, and 23a6 each having, respectively, resistances: $R_{MRa1}$, $R_{MRa2}$, $R_{MRa3}$, $R_{MRa4}$, $R_{MRa5}$, and $R_{MRa6}$ which vary with magnetic field variation. A second group 52 in FIG. 6 consists of the MR segments 23b1, 23b2, 23b3, 23b4, 23b5, and 23b6 each having, respectively, resistances: $R_{MRb1}$, $R_{MRb2}$, $R_{MRb3}$, $R_{MRb4}$, $R_{MRb5}$, and $R_{MRb6}$ which vary with magnetic field variation. A third group 54 in FIG. 6 consists of the MR segments 23c1, 23c2, 23c3, 23c4, 23c5, and 23c6 each having, respectively, resistances: $R_{MRc1}$, $R_{MRc2}$, $R_{MRc3}$, $R_{MRc4}$, $R_{MRc5}$, and $R_{MRc6}$ which vary with magnetic field variation.

According to a preferred method of fabrication, an indium antimonide epitaxial film (or another suitable magnetoresistive material) is formed, then masked and etched to thereby provide the aforementioned mesas characterizing the segments 23ax, 23bx, and 23cx of each of the six MR elements 23". The techniques for fabricating the MR segments are elaborated in aforementioned U.S. Pat. Nos. 5,153,557 and 5,184,106.

It is preferable that the respective corresponding MR segments 23ax, 23bx, and 23cx within one group, for example 50 in FIG. 6, be matched to the respective corresponding MR segments of the other groups, for example 52 and 54 in FIG. 6, and that the geometry of the interdigitation of the MR segments is such that the magnitude of the increase of the resistance of one MR segment within one group is the same as the magnitude of the decrease in resistance of a respective corresponding MR segment within a diametrically opposed group, but this is not essential. Proper circuit design with appropriate weighting factors, determined empirically or theoretically, can be applied by those of ordinary skill in the art to accommodate MR segment mismatch and interdigitation geometries.

As can be discerned from FIG. 5, the end points of MR segment 23ax terminate at a first terminal (bonding pad) 50-x and a second terminal (bonding pad) 50'-x. The end points of MR segment 23bx terminate at a third terminal (bonding pad) 52-x and a fourth terminal (bonding pad) 52'-x. The end points of MR segment 23cx terminate at a fifth terminal (bonding pad) 54-x and a sixth terminal (bonding pad) 54'-x. The end points of corresponding segments of the other five MR elements terminate at similarly designated terminals (bonding pads), respectively.

FIG. 6 depicts an example of the electronics for implementing an MR sensor 36 (shown at FIG. 1A) utilizing a plurality of the MR elements 23" of FIG. 5A according to the present invention. The MR segments are arranged in three groups, 50, 52, and 54, and are connected serially within each group as shown. Voltage source $V''_0$ supplies power to a first free terminal of the serially connected MR segments of each group wherein the second free terminal of the serially connected segments of each group are connected to ground. It is also noted that all voltages are measured with respect to ground unless otherwise indicated.

The output voltages $V''_A$, $V''_B$, and $V''_C$ are chosen such that they are sinusoidal functions of the tooth 18 position spaced 120 degrees apart from one another, respectively as the shaft 12 rotates, whereby the resistance of the MR elements vary as previously described, and wherein $V''_A = V''_0 \times (R_{MRa1}+R_{MRa2}+R_{MRa3})/(R_{MRa1}+R_{MRa2}+R_{MRa3}+R_{MRa4}+R_{MRa5}+R_{MRa6})$, $V''_B=V''_0 \times (R_{MRb3}+R_{MRb4}+R_{MRb5})/(R_{MRb1}+R_{MRb2}+R_{MRb3}+R_{MRb4}+R_{MRb5}+R_{MRb6})$, and $V''_C = V''_0 \times (R_{MRc5}+R_{MRc6}+R_{MRc1})/(R_{MRc1}+R_{MRc2}+R_{MRc3}+R_{MRc4}+R_{MRc5}+R_{MRc6})$. In this example $V''_B$ would lag (or lead) $V''_A$ by 120 degrees and $V''_C$ would lag (or lead) $V''_A$ by 240 degrees thereby providing the means to determine the position of the shaft (rotor) 12 of the motor 10.

A galvanomagnetic sensor may be used in place of a magnetoresistive sensor, which was used herein by way of preferred example. The shape of the MR elements is pie shaped, wherein the outer periphery of each MR element may be straight, curved or otherwise shaped, and the number of MR elements may be other than six, six being used herein merely by way of elucidating a preferred embodiment. Any magnetic irregularity at the end face of a shaft may be used in substitution for the preferred tooth and slot as recounted hereinabove, inclusive of one or more teeth or one or more permanent magnets, wherein the permanent magents may obviate the bias magnet. The plurality of voltage signals may be other than sinusoidal, wherein the voltage signals are in the form of at least two periodically variable voltages which have a predetermined phase spacing therebetween.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A position sensor comprising:
   a shaft having a magnetic irregularity located at an end face thereof, said end face defining a plane perpendicular to a center line of the shaft; and
   a galvanomagnetic sensor covering a predetermined area wherein the center thereof is aligned with the center line of the shaft adjacent the end face at an orientation parallel to said plane, said galvanomagnetic sensor comprising a plurality of substantially pie shaped galvanomagnetic sensor elements, and circuit means for providing a voltage signal therefrom which is responsive to rotative position of the magnetic irregularity;
   wherein as the shaft rotates relative to the galvanomagnetic sensor, the galvanomagnetic sensor provides a plurality of periodically variable voltage signals having predetermined phase spacing therebetween, wherein the voltage signals are indicative of rotative position of the shaft;

wherein said plurality of galvanomagnetic sensor elements comprises:
   a substantially pie shaped first magnetoresistor;
   a substantially pie shaped second magnetoresistor;
   a substantially pie shaped third magnetoresistor;
   a substantially pie shaped fourth magnetoresistor;
   a substantially pie shaped fifth magnetoresistor; and
   a substantially pie shaped sixth magnetoresistor;
wherein a difference between two sums, with a first sum comprising an addition of any three consecutive magnetoresistors of the first, second, third, fourth, fifth and sixth magnetoresistors, and a second sum comprising an addition of a remaining three consecutive magnetoresistors, is a periodic function of rotative position of said magnetic irregularity;
wherein said difference comprises any one of three groups, wherein a first group comprises the first magnetoresistor plus the second magnetoresistor plus the third magnetoresistor minus the fourth magnetoresistor minus the fifth magnetoresistor minus the sixth magnetoresistor; a second group comprises the third magnetoresistor plus the fourth magnetoresistor plus the fifth magnetoresistor minus the sixth magnetoresistor minus the first magnetoresistor minus the second magnetoresistor; and a third group comprises the fifth magnetoresistor plus the sixth magnetoresistor plus the first magnetoresistor minus the second magnetoresistor minus the third magnetoresistor minus the fourth magnetoresistor;
wherein said circuit means provides a matched current source independently for each of said first, second, third, fourth, fifth and sixth magnetoresistors.

2. The position sensor of claim 1, wherein said circuit means further comprises a first operational amplifier to derive a first sinusoidal voltage signal from said first group; a second operational amplifier to derive a second sinusoidal voltage signal from said second group; and a third operational amplifier to derive a third sinusoidal voltage signal from said third group, wherein each of said first, second and third voltage signals are spaced 120 degrees apart.

3. The position sensor of claim 2, wherein said magnetic irregularity comprises a ferromagnetic tooth occupying a semi-circular area of said end face.

4. The position sensor of claim 1, wherein said first, second, third, fourth, fifth and sixth magnetoresistors are serially connected, wherein a first sinusoidal voltage signal is provided at a connection between said third and fourth magnetoresistors, wherein a second sinusoidal voltage signal is provided by a first operational amplifier connected to a connection between said fifth and sixth magnetoresistors and to a connection between said second and third magnetoresistors, and wherein a third sinusoidal voltage signal is provided by a second operational amplifier connected to a connection between said sixth magnetoresistor and a source of voltage, to a connection between said fourth and fifth magnetoresistors, and to a connection between said first and second magnetoresistors; wherein each of said first, second and third voltage signals are spaced 120 degrees apart.

5. The position sensor of claim 4, wherein said magnetic irregularity comprises a ferromagnetic tooth occupying a semi-circular area of said end face.

6. A position sensor comprising:
   a shaft having a magnetic irregularity located at an end face thereof, said end face defining a plane perpendicular to a center line of the shaft; and
   a galvanomagnetic sensor covering a predetermined area wherein the center thereof is aligned with the center line of the shaft adjacent the end face at an orientation parallel to said plane, said galvanomagnetic sensor comprising a plurality of substantially pie shaped galvanomagnetic sensor elements, and circuit means for providing a voltage signal therefrom which is responsive to rotative position of the magnetic irregularity;
wherein as the shaft rotates relative to the galvanomagnetic sensor, the galvanomagnetic sensor provides a plurality of periodically variable voltage signals having predetermined phase spacing therebetween, wherein the voltage signals are indicative of rotative position of the shaft;
wherein said plurality of galvanomagnetic sensor elements comprises a plurality of substantially pie shaped magnetoresistor elements, each magnetoresistor element thereof comprising a plurality of mutually interdigitated magnetoresistor segments; wherein said circuit means serially connects a selected magnetoresistor segment of each magnetoresistor element, respectively, to thereby form a plurality of groups of the interdigitated magnetoresistor segments, wherein each group provides a respective periodically varying voltage signal of the plurality of periodically varying voltage signals.

7. The position sensor of claim 6, wherein said plurality of periodically varying voltage signals are sinusoidal and mutually 120 degrees out of phase.

8. The position sensor of claim 7, wherein said magnetic irregularity comprises at least one ferromagnetic tooth.

9. The position sensor of claim 6, wherein said plurality of galvanomagnetic sensor elements comprises:
   a substantially pie shaped first magnetoresistor element comprising first, second and third magnetoresistor segments which are mutually interdigitated;
   a substantially pie shaped second magnetoresistor element comprising fourth, fifth and sixth magnetoresistor segments which are mutually interdigitated;
   a substantially pie shaped third magnetoresistor element comprising seventh, eighth and ninth magnetoresistor segments which are mutually interdigitated;
   a substantially pie shaped fourth magnetoresistor element comprising tenth, eleventh and twelfth magnetoresistor segments which are mutually interdigitated;
   a substantially pie shaped fifth magnetoresistor element comprising thirteenth, fourteenth and fifteenth magnetoresistor segments which are mutually interdigitated; and
   a substantially pie shaped sixth magnetoresistor element comprising sixteenth, seventeenth and eighteenth magnetoresistor segments which are mutually interdigitated;
wherein a first group of magnetoresistor segments comprises a serial connection of the first, fourth, seventh, tenth, thirteenth and sixteenth magnetoresistor segments; a second group of magnetoresistor segments comprises a serial connection of the second, fifth, eighth, eleventh, fourteenth and seventeenth magnetoresistor segments; and a third group of magnetoresistor elements comprises a serial connection of said third, sixth, ninth, twelfth, fifteenth and eighteenth magnetoresistor segments; and
wherein a first sinusoidal voltage signal is provided at a connection between the seventh and the tenth magnetoresistor segments, a second sinusoidal voltage signal is provided at a connection between the fourteenth and the seventeenth magnetoresistor segments, and a third sinusoidal voltage signal is provided at a connection between the third and the sixth magnetoresistor segments.

10. A galvanomagnetic die for a position sensor comprising:
   a galvanomagnetic die covering a predetermined area, said galvanomagnetic die comprising a plurality of substantially pie shaped galvanomagnetic sensor elements for providing a plurality of periodic resistance values having a predetermined phase spacing therebetween in response to rotational movement of an adjacent magnetic irregularity;
   wherein said plurality of galvanomagnetic sensor elements comprises a plurality of magnetoresistive elements comprising:
      a substantially pie shaped first magnetoresistor element;
      a substantially pie shaped second magnetoresistor element;
      a substantially pie shaped third magnetoresistor element;
      a substantially pie shaped fourth magnetoresistor element;
      a substantially pie shaped fifth magnetoresistor element; and
      a substantially pie shaped sixth magnetoresistor element;
   wherein each magnetoresistor element comprises a plurality of mutually interdigitated magnetoresistor segments; and wherein the resistance difference between a sum of any three consecutive magnetoresistor elements of said first, second, third, fourth, fifth and sixth magnetoresistor elements is a periodic function of rotative position of the magnetic irregularity.

* * * * *